United States Patent [19]
Ducate, Sr.

[11] Patent Number: 4,749,013
[45] Date of Patent: Jun. 7, 1988

[54] WOODWORKING MACHINE WITH FLOATING TOOL AND WORK CARRIAGES

[75] Inventor: John S. Ducate, Sr., Columbia, S.C.

[73] Assignee: The JDS Company, Inc., Columbia, S.C.

[21] Appl. No.: 102,317

[22] Filed: Sep. 25, 1987

Related U.S. Application Data

[63] Continuation-in-part of Ser. No. 933,398, Nov. 21, 1986, abandoned.

[51] Int. Cl.$^4$ ............................................. B27C 5/06
[52] U.S. Cl. .............................. 144/145 R; 144/84; 144/137; 144/372; 409/87; 409/89; 409/124
[58] Field of Search ............... 409/217, 87, 89, 108, 409/124; 144/84, 87, 136 R, 137, 145 R, 144 R, 372

[56] References Cited

U.S. PATENT DOCUMENTS

| | | |
|---|---|---|
| 11,006 | 6/1854 | Allen . |
| 93,710 | 8/1869 | Griffith . |
| 94,205 | 8/1869 | Storer . |
| 553,393 | 1/1896 | Charrier . |
| 1,333,912 | 3/1920 | Grant . |
| 1,638,652 | 8/1927 | Blood . |
| 1,800,181 | 4/1931 | Herider . |
| 2,166,831 | 7/1939 | Wazac .................................. 144/84 |
| 2,542,615 | 2/1951 | Balazs . |
| 2,543,917 | 3/1951 | Lloyd . |
| 2,912,879 | 11/1959 | Bannow . |
| 3,404,601 | 10/1968 | Onsrud . |
| 3,709,096 | 1/1973 | Stender-Robertz . |
| 3,734,153 | 5/1973 | Reed . |
| 3,739,824 | 6/1973 | Hoenig . |
| 3,865,161 | 2/1975 | Vizziello et al. . |
| 4,163,465 | 8/1979 | Strong .................................. 144/87 |
| 4,445,553 | 5/1984 | Hanyzewski et al. . |
| 4,509,572 | 4/1985 | L'Archer .............................. 144/137 |
| 4,534,093 | 8/1985 | Jahnke et al. . |
| 4,593,731 | 6/1986 | Tanaka . |
| 4,593,735 | 6/1986 | Wirth .................................... 144/137 |

Primary Examiner—W. Donald Bray
Attorney, Agent, or Firm—Pollock, Vande Sande & Priddy

[57] ABSTRACT

A woodworking apparatus including a work carriage having a base mounted on a bed for rectilinear sliding movement along a first axis in a first plane and a work platform mounted on the base for rectilinear sliding movement along a second axis parallel to the first axis and in a second plane parallel to the first plane. A tool carriage carrying a motor driven rotary cutting tool is mounted on the bed for rectilinear sliding movement along a third axis transverse to the first and second axes. Levers are provided for actuating movements of the base, the platform, and the tool carriage. A gas spring may be connected with the tool carriage to counterbalance the weight of the tool carriage assembly. A template and following stylus also may be provided for guiding the tool carriage relative to the work carriage in accordance with a predetermined pattern. The work surface supporting a workpiece may be tilted relative to the rotational axis of the cutting tool. Various clamping devices allow adjustment of the tool carriage, the work carriage and their actuators.

27 Claims, 6 Drawing Sheets

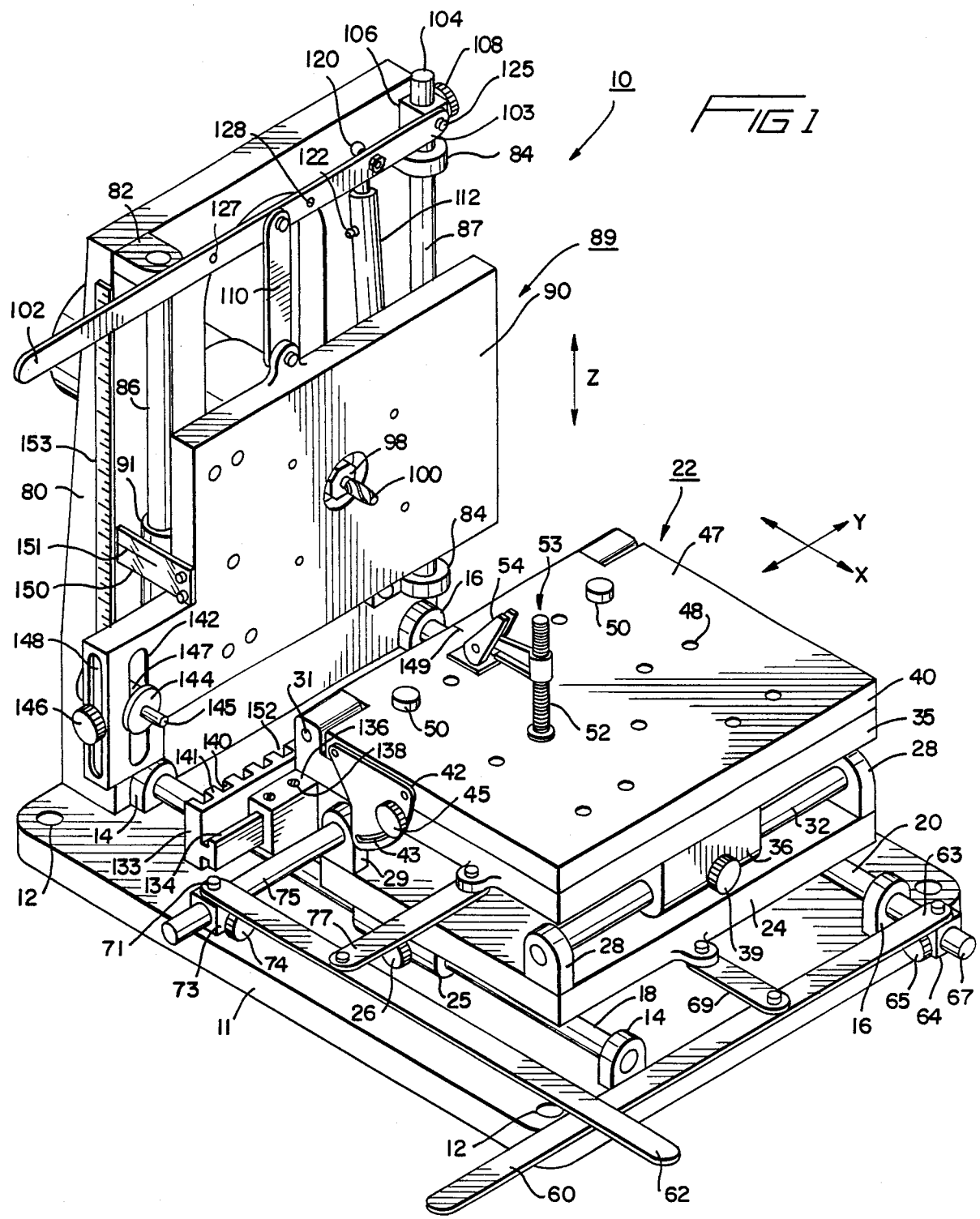

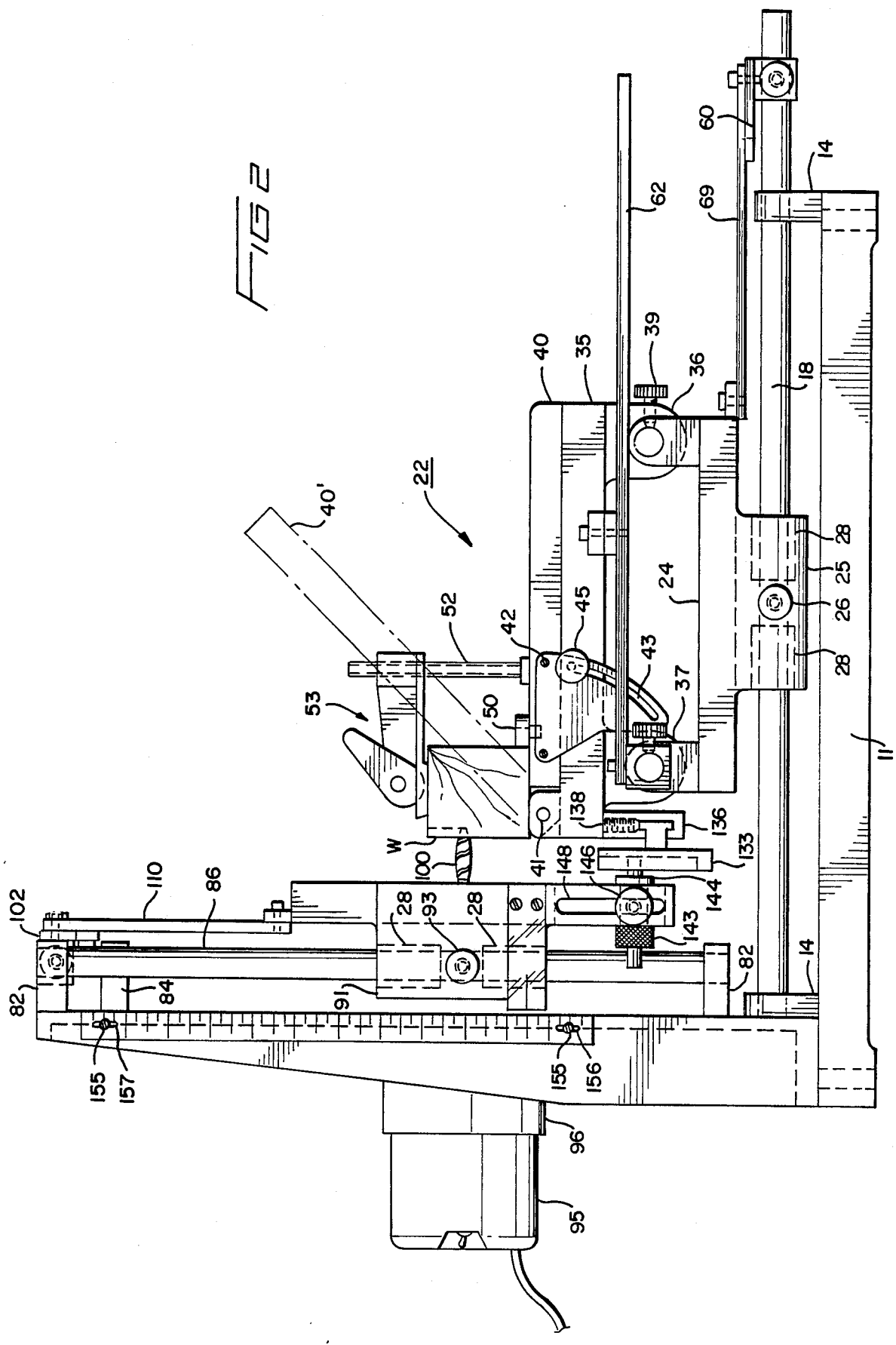

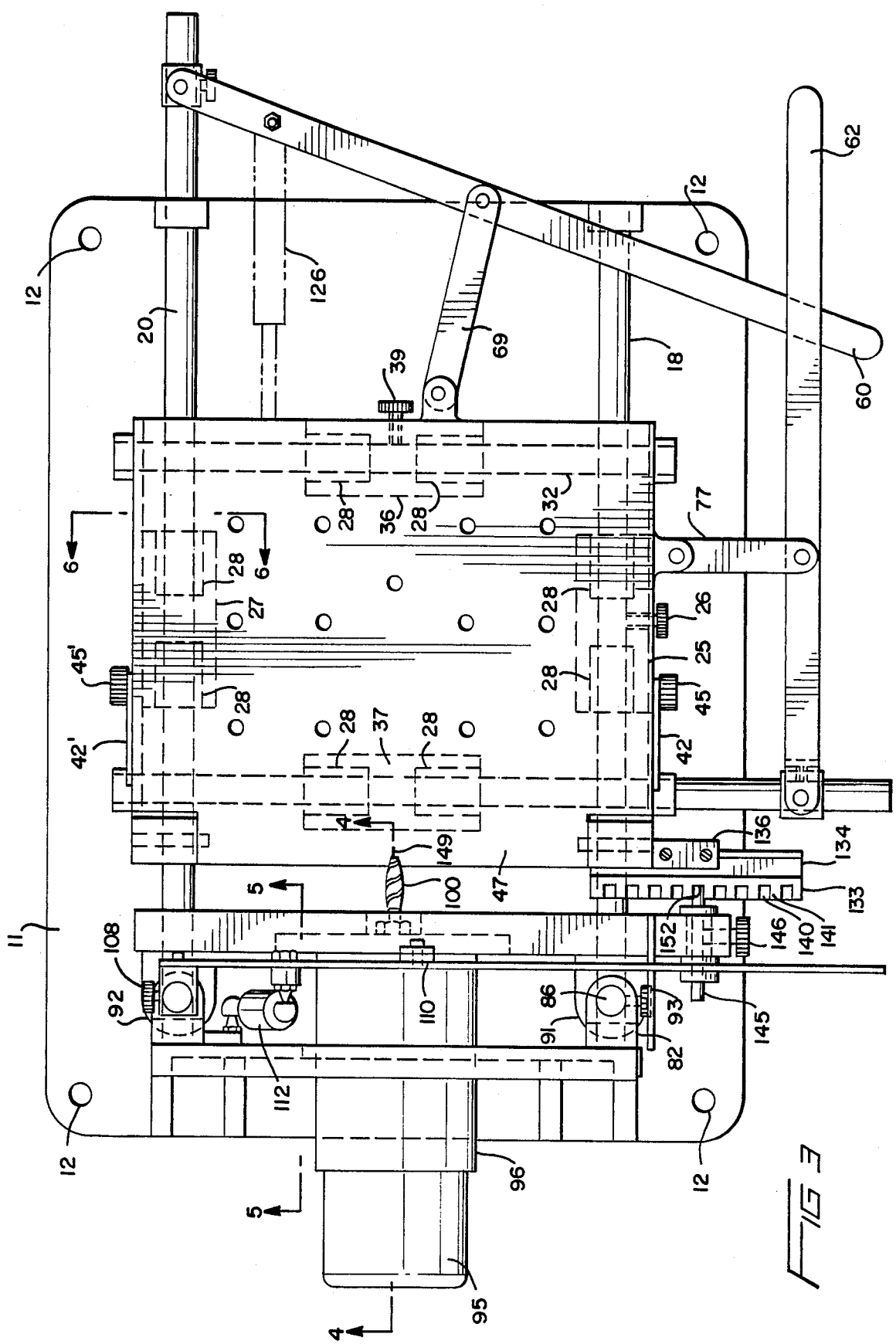

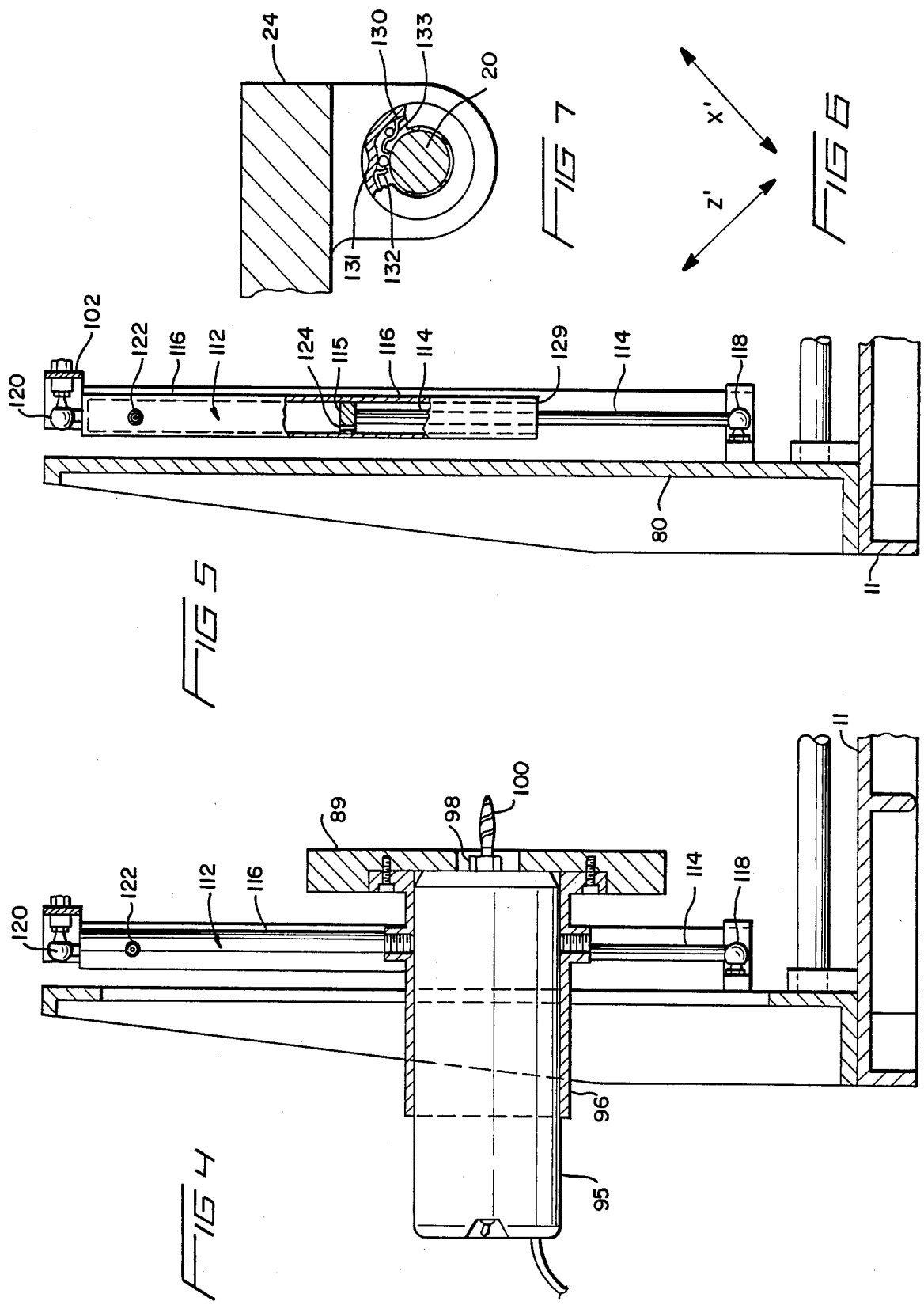

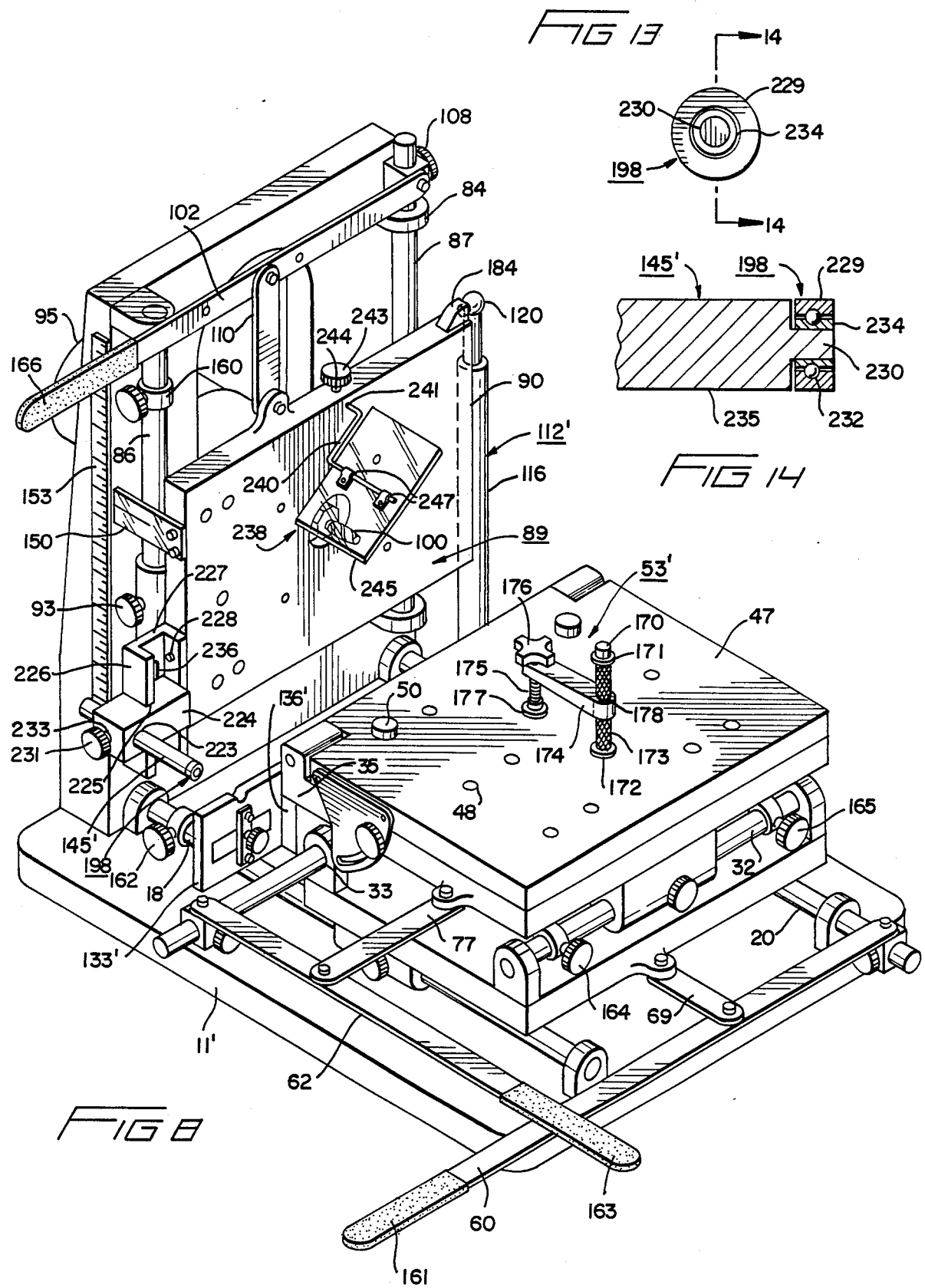

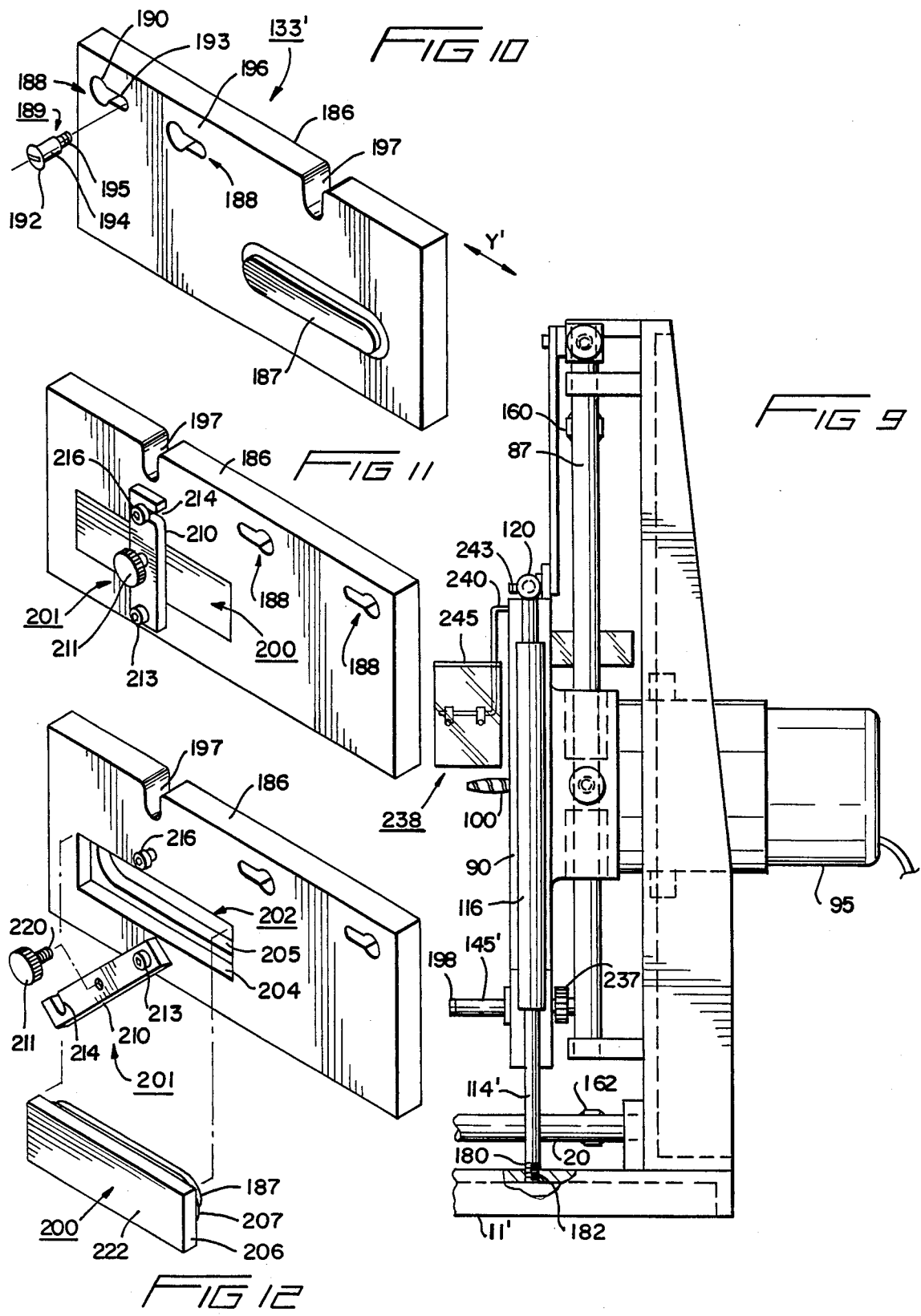

WOODWORKING MACHINE WITH FLOATING TOOL AND WORK CARRIAGES

This application is a continuation-in-part of application Ser. No. 933,398, filed Nov. 21, 1986 now abandoned.

TECHNICAL FIELD

The present invention relates to woodworking machines in which the cutting tool carriage and the work carriage are mounted for floating movement relative to each other in response to hand pressure.

BACKGROUND OF THE INVENTION

A variety of machine tools for woodworking are described in the prior art both for industrial use and for the home craftsman. However, these machines are relatively complex to assemble and to operate and have tool and work carriages that are cumbersome to manipulate by hand. Because of their complexity, such machines are relatively expensive and may require frequent and costly maintenance. Therefore, in spite of prior art advances, there remains a need for a woodworking machine that is of relatively inexpensive construction, is easy to maintain, and is capable of easy and accurate hand manipulation by the home craftsman.

SUMMARY OF THE INVENTION

The present invention provides a woodworking machine having a work carriage for a workpiece and a tool carriage for a motor driven cutting tool. Each of these carriages is capable of easy, comfortable and accurate manipulation by the home craftsman for performing a wide variety of cutting functions, such as routing, boring, mortising, tenoning, and other three-dimensional shaping of both internal and external surfaces of a workpiece made of wood, plastic or the like. The machine is compact in size, is of a portable weight and structure, and is of relatively simple and inexpensive construction. The machine has conveniently positioned manual controls that are easily manipulated by an operator to produce rectilinear movement of a cutting tool relative to a workpiece and movement of the workpiece in any direction within a plane transverse to the rectilinear movement of the cutting tool.

These objects and advantages are achieved by a woodworking machine comprising means for providing floating movement of a workpiece in any direction in one plane, and means for providing floating movement of a cutting tool back and forth along a cutting axis transverse to the plane of workpiece movement. More particularly, a preferred embodiment of the woodworking machine comprises a tool means for providing a rotating cutting tool, a bed, a workpiece carriage having a base mounted on the bed for sliding movement back and forth along an axis in a first plane and a work platform for supporting a workpiece and mounted on the base for sliding movement back and forth along an axis transverse to the first axis and in a second plane parallel to the first plane, first and second levers with connecting linkages for causing movement of the base and the platform along the first and second axes, respectively, a first fulcrum means for pivotally mounting the proximal end of the first lever, a second fulcrum means for pivotally mounting the proximal end of the second lever, a tool carriage for supporting the tool means and mounted on the bed for sliding movement back and forth along a third axis transverse to the first and second axes, a pivotally mounted third lever with a connecting linkage for causing movement of the tool carriage back and forth along the third axis in response to lever movement so as to move the cutting tool toward and way from the workpiece when it is supported on the platform, and biasing means connected with the tool carriage for counterbalancing the weight of the tool carriage, the tool means and the actuating linkages.

The biasing means preferably is a gas spring capable of providing a biasing force sufficient to move the cutting tool away from the workpiece when the tool carriage lever is released by an operator of the machine. The gas spring may be connected either directly to a component of the tool carriage or to the third lever. Connection to the third lever allows changing the biasing force applied to the tool carriage by changing the location of the connection between the lever and the gas spring.

Preferably at least one, and more preferably both, of the first and second fulcrum means are adjustable relative to the bed so as to change the positions at which the distal ends of the first and second levers may be manipulated for the cutting of a particular workpiece. This adjustable feature provides flexibility in working on workpieces of different sizes and shapes and facilitates manipulation of the levers by the operator who may adjust the location of each fulcrum means to place the distal ends of the levers at the most comfortable positions for hand manipulation. The tool carriage lever also may be provided with an adjustable fulcrum means for the same purposes.

There also may be provided a pattern means having a template member mounted on the workpiece carriage and a following stylus mounted on an opposing portion of the tool carriage for guiding relative movement between the cutting tool and the workpiece in accordance with a predetermined pattern. In addition, an upper plate member of the work platform may be adjustable to tilt the workpiece at different angles relative to the rotational axis of the cutting tool.

BRIEF DESCRIPTION OF THE DRAWINGS

The features, operation and advantages of the present invention may be better understood from the description below of specific embodiments thereof taken in conjunction with the accompanying drawings in which:

FIG. 1 is a perspective view of a woodworking machine according to the present invention;

FIG. 2 is a front elevational view of the woodworking machine of FIG. 1 as seen from the position of an operator;

FIG. 3 is a plan view of the woodworking machine of FIG. 1;

FIG. 4 is a fragmentary elevational view in section taken along lines 4—4 of FIG. 3 and showing the motor driven cutting tool;

FIG. 5 is a fragmentary elevational view in section taken along lines 5—5 of FIG. 3 and showing in partial section a gas spring for upwardly biasing the cutting tool;

FIG. 6 is a diagrammatic view illustrating tool carriage and work carriage movement axes for a modification of the invention;

FIG. 7 is a fragmentary sectional view taken along lines 6—6 of FIG. 3 and showing in partial section details of one of the linear bearings upon which the workpiece carriage floats.

FIG. 8 is a perspective view of a modification of the woodworking machine according to the present invention;

FIG. 9 is a fragmentary rear elevational view of the modified embodiment of FIG. 8;

FIG. 10 is a perspective view of the front of a modified template structure;

FIG. 11 is a perspective view of the back of the modified template structure of FIG. 10;

FIG. 12 is an exploded perspective view of the back of the modified template structure of FIG. 10 showing disassembly of individual parts;

FIG. 13 is a front end view of the stylus for following the template of FIG. 10; and, FIG. 14 is an enlarged fragmentary side view in section of the stylus of FIG. 13.

BEST MODE AND OTHER SPECIFIC EMBODIMENTS

The woodworking machine 10 illustrated in FIGS. 1–3 of the drawings includes a bed 11 having apertures 12 for fixedly securing the whole machine on a workbench, table or other underlying support. The bed 11 may be made of cast aluminum and the weight and structure of machine 10 is such that it may be easily portable. In the alternative, the bed 11 may be integrally connected to a foundation or other fixed underlying structure so that machine 10 is permanently installed instead of being a portable structure temporarily secured to an underlying support.

Fixedly secured to the bed 11 are two pairs of upstanding studs 14—14 and 16—16. Two guide rods or tracks 18 and 20 extend parallel to each other in a side to side direction defined by an axis arrow X and are secured at their opposite ends to studs 14—14 and 16—16, respectively. Floatingly carried upon rods 18 and 20 is a workpiece carriage generally designated 22. Carriage 22 includes a base 24 having a pair of depending pedestals 25 and 27 each of which carries a pair of linear anti-friction bearings 28—28 which slidably engage the parallel guide rods 18 and 20 for rectilinear movement back and forth along an X-axis parallel to the arrow X in FIG. 1, which indicates the orientation of the side to side axis of movement relative to the operator. Although other tool orientations are possible, the X-axis of base 24 also is parallel to the rotational axis of the cutting tool 100 in the particular embodiment shown in the drawings. Threaded within an aperture in pedestal 25 is a clamping screw having a hand knob 26. The opposite end of the clamping screw from knob 26 may be tightened against the rod 18 so as to lock the base 24 in a fixed position along the X-axis.

Two pairs of upstanding studs 28—28 and 29—29 (one not shown) are rigidly secured to the upper surface of base 24. A second pair of guide rods 32 and 33 are fixedly secured at their opposite ends to the upstanding studs 28—28 and 29—29, respectively. The second pair of guide rods 32, 33 extend transversely, preferably orthogonally, relative to the first pair of guide rods 18, 20. A platform 35 is mounted by pedestals 36 and 37 on guide rods 32 and 33 for rectilinear sliding movement along a Y-axis parallel to the arrow Y in FIG. 1, which indicates the orientation of the in and out axis of movement relative to the operator. Pedestals 36 and 37 each having a pair of linear bearings 28—28 for slidably engaging guide rods 32 and 33, respectively. Threaded within an aperture in pedestal 36 is a clamping screw having a knob 39. The opposite end of this clamping screw from knob 39 may be tightened against the rod 32 so as to lock the platform 35 in a fixed position along the Y-axis.

As best shown in FIG. 2, a tiltable plate 40 is pivotally secured at 41 to platform 35 so that the plate may be tilted at different angles to the horizontal as illustrated by the moved position of plate 40 shown by the broken line 40'. Fixedly secured to the side of plate 40 is a triangular bracket 42 having a slot 43 therein through which passes the shank of a clamping knob 45. The shank of knob 45 is threaded into platform 35 so that knob 45 may be tightened against bracket 42 to clamp plate 40 in the raised position desired. The range of angles through which plate 40 may be tilted is about 0–45° in the embodiment shown, although slot 43 may be cut for a larger or smaller range. A second clamping bracket 42' and a second clamping knob 45' are preferably provided on the opposite side of carriage 22.

The plate 40 has an upper work surface 47 which is penetrated by a plurality of threaded holes 48 for receiving both the threaded shanks of work positioning pins 50—50 and the threaded column 52 of a work clamping mechanism 53 having an eccentrically pivoted clamping lever 54. A workpiece "W" may be held securely in position against pins 50 by clamping mechanism 53 as illustrated in FIG. 2.

Actuation of the work carriage 22 for movement of the workpiece W in any direction within a work plane defined by arrows X and Y is provided by a first lever 60 and a second lever 62. The proximal end of lever 60 is pivotally secured to a fulcrum block 64 which has an aperture for slidably receiving an extension 67 of guide bar 20 which extends outward beyond stud 16. A threaded clamping screw with a hand knob 65 passes through block 64 so as to clampingly engage extension 67. The proximal end 63 of lever 60 is thereby adjustable anywhere along the extension 67 of guide bar 20. A link 69 pivotally connects an intermediate portion of the lever 60 to the base 24 such that pivotal movement of lever 60 will cause corresponding rectilinear movement of the base 24 along the X-axis of movement.

The proximal end 71 of lever 62 is pivotally connected to a fulcrum block 73 having a threaded clamping screw with a hand knob 74. Fulcrum block 73 allows adjustment of the proximal end 71 of lever 62 anywhere along an extension 75 of guide bar 33 which extends outward beyond stud 29. A link 77 pivotally connects an intermediate portion of lever 62 to the platform 35 so as to provide corresponding rectilinear movement of platform 35 back and forth along the Y-axis of movement.

With the clamping knobs 26 and 39 fully loosened, the foregoing structure is such that movement of lever 60 and 62 in various combinations may be employed so as to move the workpiece W mounted on carriage 22 in any direction within the work plane represented by the intersecting X and Y arrows of FIG. 1. It also follows from this structure that once a workpiece is clamped in position on the work surface 47 of plate 40, the distal ends of levers 60 and 62 may be adjusted so as to be in easy reach of the machine operator by appropriate adjustments of the fulcrum blocks 64 and 73, respectively.

To the left side of the bed 11 as viewed in FIGS. 1 and 2, a pillar 80 is positioned in opposing relation to work carriage 22 and is rigidly secured at its proximal end to the bed 11. Two pairs of studs 82—82 and 84—84 are rigidly secured to pillar 80 and project outwardly toward work carriage 22. A third pair of guide rods 86 and 87 extend parallel to each other and are fixedly secured at their opposite ends to the pairs of studs 82—82 and 84—84, respectively. A tool carriage 89 comprises a plate 90 mounted for rectilinear sliding movement on rods 86 and 87 by a pair of pedestals 91 and 92 projecting inwardly toward the pillar 80 from opposite edge portions of plate 90. The bed 11, base 24, platform 35, plate 40, pillar 80 and plate 90 preferably are all made of cast aluminum.

As seen best in FIG. 2, floating engagement between tool carriage 89 and guide rods 86 and 87 is provided by a pair of anti-friction linear bearings 28—28 carried by each of the pedestals 91 and 92. Threaded within an aperture in pedestal 91 is a clamping screw having a knob 93. The opposite end of this clamping screw from knob 93 may be tightened against rod 86 so as to lock the tool carriage 89 in a fixed position along the Z-axis.

An electric motor 95 is mounted on the same side of carriage 89 as pedestals 91 and 92 by means of a cylindrical housing 96 bolted to the tool carriage plate 90 on the side opposite from work carriage 22. The motor is positioned with its driving end toward work carriage 22 and this driving end includes a chuck 98 for securely holding and rotating a cutting tool 100. Cutting tool 100 may be a router, a drill, a mortising tool, a tenoning tool, or other cutting tool for shaping the interior or the exterior of a workpiece carried on the work surface of carriage 22.

A lever 102 is mounted for pivotal movement for actuating corresponding rectilinear movement of the carriage 89 along a Z-axis of movement parallel to the arrow Z in FIG. 1. The proximal end 103 of lever 102 is adjustably clamped to an extension 104 of guide rod 87 beyond upper stud 84 by means of a fulcrum block 106 having a clamping screw with a knob 108. A link 110 pivotally connects an intermediate portion of lever 102 to tool carriage 89 as shown best in FIG. 1. In a manner similar to the adjustment of levers 60 and 62, the operating position of the distal end of lever 102 may be placed in a position convenient to the operator by moving clamping block 106 along the guide rod extension 104 and then clamping block 106 by tightening knob 108 at the location giving the desired position of the opposite distal end.

A gas spring 112 is provided to counterbalance the weight of tool carriage 89, motor 95 and the other components carried by carriage 89, and the actuating linkages which include lever 102 and link 110. Referring to FIG. 5, gas spring 112 includes a piston rod 114 and a piston 115 hermetically sealed within a high pressure gas cylinder 116. The outer end of piston rod 114 opposite from piston 115 is pivotally connected to the pillar 80 by a ball joint 118. The outer end of cylinder 116 opposite from piston rod 114 is pivotally connected to actuating lever 102 by a ball joint 120. Optionally, the outer end of piston rod 114 may be fitted loosely within a concave recess (not shown) in bed 11 and the outer end of the cylinder may be connected by a ball joint such as 120 directly to the rear, side or front of plate 90 of tool carriage 89. This option eliminates the ball joint 118 and may be used where space between plate 90 and pillar 80 is too restrictive.

Pressure cylinder 116 is pressurized with a gas which may be an inert gas or air, and may be loaded with a fixed pressure at the factory or optionally provided with a gas valve 122 for variable loading by the machine operator. Piston 115 is provided with an orifice 124 which allows the pressurized gas to transfer freely from one side of piston 115 to the other. Since the rod side of the piston has a smaller surface area exposed to the gas, the gas pressure provides a biasing force to push rod 114 outward relative to cylinder 116. The direction of the biasing force is along the Z axis of movement in the direction away from the work carriage 22, which is in an upward direction relative to the vertical orientation of the machine 10 shown in the drawings. The outward (upward in the drawings) biasing force generated by gas spring 112 is continuous and preferably linear.

The biasing force provided by gas spring 112 can be varied from zero to the design pressure of cylinder 116 and preferably is chosen so as to be slightly greater than the opposing force represented by the weight of the lever actuator, the tool carriage 89 and the components carried thereby. The excess outward biasing force preferably is in the range of about 1 to about 5 pounds, more preferably in the range of about 2 to about 3 pounds. For example, where the total weight of the tool carriage and related components provide an inward force of about 17 to 18 pounds, the gas spring is pressurized to a gas pressure providing an outward force of about 20 pounds where gas spring 112 is connected directly to the tool carriage 89. Where the gas spring is connected instead to lever 102 as shown in the drawings, the gas pressure required to counterbalance the tool carriage and related components depends on the relative lengths of the lever arm from ball joint 120 to lever pivot connection 125 and the lever arm from the pivot connection 126 of link 110 to lever pivot connection 125. Extra holes 127 and 128 may be provided in lever 102 for changing the lever arm of ball joint 120 (hole 127 requires mounting air spring 112 on the opposite side of motor 95 from where it is shown in the drawings). Factory-loaded gas springs with outward forces from about 20 to about 250 pounds are available from The Gas Spring Company of Colmar, Pa.

The gas spring may act as a stop when fully extended so that no other stop is required at the outward end of tool carriage travel. For this purpose, cylinder 116 preferably contains a small quantity of oil (not shown) which accumulates adjacent to its lower end wall 129 and will pass through orifice 124 as piston 115 approaches the lower end wall at the other end of the piston stroke. This oil flow through orifice 124 provides a damping effect which may be used to avoid shock by cushioning the motion of tool carriage 89 when it reaches the end of its outward travel. The length of travel over which such cushioning is provided is determined by the amount of oil in the lower portion of the cylinder and this amount may be adjusted as needed for the weight and travel distance of the tool carriage and the amount of excess biasing force provided.

The woodworking machine of the present invention may have other orientations than the vertical orientation shown in FIGS. 1-5 of the drawings. One such non-vertical orientation is illustrated in FIG. 6 wherein the Z-axis of movement is tilted away from the vertical and the X-axis of movement is tilted away from the horizontal in a counterclockwise direction such that the back and forth movement of travel the tool carriage along the Z-axis and the back and forth movement of the work carriage along the X-axis are both on an incline. This is easily accomplished by mounting the bed 11 on an underlying wedge-shaped frame (not shown). In this non-vertical orientation, base 24 of the work carriage is connected to a second gas spring 126 as shown in phantom outline in FIG. 3. The gas pressure for gas spring 126 is selected so as to substantially counterbalance the force generated in the inward direction along the X-axis by the weight of the work carriage 22 and related structure, including the workpiece itself. Similarly, the gas pressure selected for gas spring 112 would be less than in the vertical orientation of the machine because less inward force would be generated along the Z-axis by the weight of the inclined tool carriage and its related components.

As previously described, each of the four pedestals utilized in the work carriage and the two pedestals used in the tool carriage contain a pair of linear bearings 28—28. A partial cross-section of one of these bearings is shown in FIG. 7. Each bearing has five oval races 130 within a surrounding sleeve 131. One of the races 130 is shown in transverse cross-section in FIG. 7. Each race has a plurality of balls some of which are in a straight run 132 (extending into the page of FIG. 7) and are in bearing contact with the corresponding guide rod (part 20 in FIG. 7). The load is carried by the portion of the balls which roll freely along the portion of the continuous ball circuit represented by the run 132. The remainder of the plurality of balls are in another straight run 133 of the oval race and in cross over portions of the circuit at each end of the race 130. The balls in these portions of the circuit are supported out of contact with the guide rod and are free to roll in the clearance provided between race 130 and bearing sleeve 131. The race 130 thus serves as a track mounted within the bearing sleeve so as to guide the plurality of balls in their proper path and transfer the balls from one straight run to the other during movement of the pedestal 127 relative to guide rod 20. The arrangement of pairs of antifriction linear bearings in each pedestal as shown in the drawings provides such low friction that only a very light touch is required for manipulation of either the work carriage 22 or the tool carriage 89. Linear bearings of the type disclosed are available from Thomson Industries, Inc.

Another important feature of the present invention is the provision of a template 133 on the work carriage and a following stylus 145 on an opposing portion of the tool carriage. The template 133 has a T-shaped rail 134 slidably received within a corresponding T-shaped slot of a mounting housing 136 fixedly secured under and along the inner forward corner of platform 35. Template 133 is detachably secured in position by a pair of set screws 138 which are threaded through the wall of housing 136 to clampingly engage rail 134. Template 133 has a plurality of slots 140 in its exposed face for receiving and guiding a portion of stylus 145 projecting toward the work carriage. In the embodiment shown, the slots 140 are laid out in a pattern for cutting parallel grooves in a wood workpiece so that the grooves are arranged in a particular relationship for use of the workpiece in making a box joint. The slots 140 and the tenonlike projections 141 therebetween may have a variety of sizes and shapes and may be arranged in a variety of different patterns for cutting and shaping the workpiece. The template pattern shown in the figures is merely one example of many for illustrative purposes. Template member 133 may be made from metal or from a hard plastic such as Delrin.

To provide flexibility in positioning the stylus 145 for different patterns on the inward face of template 133, stylus 145 is vertically adjustable along a slot 142 cut in plate 90 of tool carriage 89 and extending along a Z-axis parallel to arrow Z in FIG. 1. Stylus 145 comprises a cylindrical rod passing through a collar 147 within slot 142. Collar 147 has an enlarged washer-shaped but integral portion 144. The end of collar 147 opposite to portion 144 is threaded and engaged by a knurled knob 143. Knob 143 and collar portion 144 are both larger than slot 142 so as to clampingly engage the edges of slot 142 therebetween. This permits stylus 145 to be clamped in any position desired within slot 142. A clamping screwing having a knob 146 is threaded into an intermediate portion of collar 147 and slides in a second slot 148 extending inward from the forward side of carriage plate 90. This arrangement permits axial adjustment of the inwardly projecting length of stylus 145 which is free to move axially through collar 147 when clamping knob 146 is loosened.

To aid in accurate positioning of the cutting tool relative to the workpiece, a center index line 149 may be provided on work surface 47 and a corresponding center slot 152 may be provided on template 133. The position of center slot 152 and the position of center index line 149 relative to the Y-axis are such that when stylus 145 is in slot 152, index line 149 and the rotational axis of cutting tool 100 are vertically aligned in a common plane parallel to the arrow Z.

To aid in accurately positioning the cutting tool relative to the workpiece, there also may be provided an indexing tab 150 of clear plastic having an index line 151. Indexing tab 150 cooperates with a scale 153 which is mounted on the operator (forward) side of pillar 80 and extends along a Z-axis parallel to arrow Z. The position of scale 153 along the Z-axis is adjustable by means of set screws 155—155 which pass through slots 156 and 157 in lower and upper end portions, respectively, of scale 153.

Referring now to FIGS. 8–14, there is shown a modification of the woodworking machine of the present invention wherein there is provided a modified clamping mechanism 53', a modified gas spring 112', a modified template 133', a modified template stylus 145', and a plurality of stop collars for adjustably fixing the range of motion of the workpiece carriage 22 and the tool carriage 89.

As shown in FIG. 8, a stop collar 160 on guide rod 86 adjustably limits the outward travel of tool carriage 89 along the Z-axis, and a stop collar 162 on guide rod 18 adjustably limits the inward travel of work carriage 22 along the X-axis. Second collars (not shown) near the opposite ends of guide rods 86 and 18 may be provided to adjustably limit the inward travel of tool carriage 89 along the Z-axis and the outward travel of work carriage 22 along the X-axis, respectively. A pair of stop collars 164 and 165 on guide rod 32 adjustably limits the forward and rearward travel of the work carriage 22 along the Y-axis.

To enhance the comfort of the operator in manipulating the work carriage 22 and the tool carriage 89 along the respective axes, the distal portions of handles 60, 62 and 102 may be provided with covers 161, 163, and 166, respectively. These handle covers may have the same shape as the distal portion of the levers and may be molded from colored plastic, such as black vinyl, or the like.

The modified work clamping mechanism 53' comprises a post 170 having upper and lower stop flanges 171 and 172, respectively, and an intermediate knurled portion 173 between flanges 171 and 172. The knurled portion 173 of post 170 passes through a slightly larger aperture 178 in one end of an elongated arm 174. A second aperture through the opposite end of arm 174 has threads for engaging corresponding threads on a shaft 175. At one end of shaft 178 is a knob 176 for rotating the shaft, and at the opposite end of shaft 175 is a foot member 177 of larger diameter for engaging the workpiece without scarring its surface. The inner end (not shown) of post 170 beyond stop 172 is received in an appropriate one of the holes 48. Both the inner end of post 170 and the holes 48 may be provided with appropriate threads for threaded engagement between post 170 and plate 40. Although the diameter of aperture 178 is slightly larger than the diameter of post 170 to permit sliding movement of arm 174 along knurled portion 173 when clamp 53' is not engaging a workpiece, these diameters are sufficiently close to provide frictional engagement between knurled portion 173 and the inside surface of aperture 178 when arm 174 is canted outward from an axis normal to the axis of post 170. This frictional engagement locks arm 174 at a fixed position along knurled portion 173 of post 170 when knob 176 is rotated to force foot 177 against the upper surface of a workpiece (such as workpiece W in FIG. 2) by causing axial movement of shaft 175.

As shown in FIG. 9, the distal end 180 of piston rod 114' of a gas spring 112' is threaded so as to be fixedly received in a threaded recess 182 in the upper surface of bed 11'. The threaded engagement between distal end 180 and bed 11' prevents vertical displacement of piston rod 114' during rapid upward movement of tool carriage 89 by actuating lever 102. The proximal end of cylinder 116 opposite from piston rod 114' is pivotally connected to the outward side edge of tool carriage plate 90 by an upstanding stud 184 which threadedly recieves the shank of the ball portion of ball joint 120. Cylinder 116 is thus positioned opposite to the rear side edge of tool carriage 89 where it is out of the way but easily accessible. Where components, such as the cylinder 116 and the ball joint 120, are the same as shown in the embodiment of FIGS. 1-5, these components have the same numerical designations in FIGS. 8-14.

The template 133 of FIGS. 1-3 may be modified in various ways. For example, as seen best in FIG. 10, a template 133' has a mounting plate 186 provided with a pair of keyhole slots 188—188 for receiving a corresponding pair of locking screws 189, only one of which is shown. Each keyhole slot 188 has a hole portion 190 of sufficient diameter to pass the head 192 of screw 189, and a slot portion 193 of sufficient width to pass shank 194 but not head 192 of screw 189. Screw 189 also includes a threaded inner shaft 195 which is received in a corresponding threaded aperture (not shown) provided in a solid mounting skirt 136', which is fixedly secured under and depends from the inner edge portion of platform 35 as shown in FIG. 8. A tenon forming profile 187 projects outwad from a planar front surface 196 of mounting plate 186. A slot 197 in an upper edge portion of mounting plate 186 provides an indexing notch for receiving stylus 145' so as to center the work surface 47 relative to cutting tool 100 in the same manner as center slot 152 of FIGS. 1-3.

With the foregoing structure, template 133' is easily installed without removal of screws 189 from skirt 136' by slipping hole portions 190 over heads 92 of loosened screws 189. Template 133' is then pushed longitudinally along a Y'-axis, which is parallel to the Y-axis of workpiece carriage 22, so that the screw shanks 194 are received in the corresponding slot portions 193. With template 133, in this position, tightening screws 189 so that screw heads 192 firmly engage the front surface 196 of mounting plate 186 will securely mount the template in position for movement with workpiece carriage 22. Similarly, the reverse manipulation will disconnect template 133' from platform 35 without removing screws 189 from skirt 136'.

As shown in FIGS. 11 and 12, tenon forming profile 187 may be carried by a template insert piece 200 removably mounted in an aperture 202 passing through a portion of mounting plate 186 in spaced relation to keyhole slots 188—188. Aperture 202 has a rear rectangular portion 204 and a front oblong portion 205 corresponding to a rear rectangular portion 206 and a forward oblong portion 207, respectively, of insert 200. Oblong portion 207 carries the forwardly projecting tenon forming profile 187 on its forward face and its periphery is machined to close tolerances so as to fit snugly within oblong portion 205 of aperture 202. To facilitate insertion and removal of insert 200, rectangular insert portion 206 is sized more loosely with respect to rectangular aperture portion 204 and is removably held therein by a latch mechanism 201 having an arm 210 carrying a clamping screw 211. Arm 210 is pivotally mounted at one end by a pivot screw 213 and has a slot 214 at the other end for engaging a latch screw 216. When slot 214 receives the shank of latch screw 216 as shown in FIG. 11, the tightening of clamping screw 211, which is threaded through an aperture 218 in arm 210, firmly presses the inner end 220 of the clamping screw shank against the rear surface 222 of insert 200. Because the head of latching screw 216 has a larger diameter than the width of slot 214, the pressure between clamping screw end 220 and the back surface 222 of insert 200 securely locks arm 210 in its latched position as shown in FIG. 11, which in turn holds insert 200 in aperture 202 as shown in FIGS. 10 and 11. Upon loosening clamping screw 211, arm 210 may be pivoted completely away from the rear of insert 200 so that insert 200 is free to be removed from aperture 202 as illustrated diagrammatically in the exploded view of FIG. 12.

The advantage of the modified template of FIGS. 10-12 is that a plurality of inserts, each for a different tenon size, may be used with a single master holder as represented by mounting plate 186. In addition, several tenon inserts each with different profile dimensions may be provided for each tenon size where variable size profiles are needed to compensate for dimensional inaccuracies in the cutting bit 100. Inaccurately sized cutting bits may be caused by wear and sharpening of the bit, or by inaccuracies in the original size of the bit. For example, each template system may include a master template holder and three inserts with profiles of different sizes for each size tenon to be cut in a workpiece. The woodworker would then select the profile size that is needed to offset a dimensional inaccuracy of the cutting bit, attach this insert to the master template holder with the latch mechanism 201, and then make the desired tenon. The nominal tenon sizes provided by a template system may vary in thickness (for example, ¼, ⅜ and ½ inch) and width (for example, 1, 1.5, 2, 2.5 and 3 inches). If, for example, there are three inserts (such as A, B and C) for each tenon size, a complete template system for 14 different sizes of tenons would consist of 42 inserts and 1 master holder. The projecting length of each tenon is variable because this length depends upon the position of tool 100 relative to the axial position of stylus 145', which is variable as described below.

As shown in FIGS. 13 and 14, stylus 145' may include a roller bearing tip 198 to facilitate relative movement between stylus 145' and tenon forming profile 187 by reducing contact friction between the sides of the raised profile and the cylindrical contact surface of the stylus. Roller bearing 198 comprises an annular roller 229 mounted on a projecting post 230 at the end of a stylus rod 235 by a plurality of ball bearings 232 held in a race structure formed along the inner periphery of roller 229 and the outer periphery of an annular journal 234 press fitted onto post 230.

The stylus 145' is axially adjustable in parallel with the X-axis by being slidably received in an aperture 223 in a block 224, which in turn has a slot 225 slidably received on a track 226 formed by one leg of a U-shaped mounting bracket 227 secured to the forward side edge of plate 90 by mounting screws 228. Stylus 145' is selectively clamped in aperture 223 by a clamping screw 231 threaded in an aperture 233 which intersects aperture 223. Block 224 is selectively clamped along track 226 by means of a clamping screw 237 (FIG. 9) which passes through a slot 236 in the base of U-shaped bracket 227. Clamping screw 237 is threaded into an aperture (not shown) in block 224 such that the tightening of screw 237 clamps block 224 against track 226 and against track 226 and against the inner surface of the base of U-shaped bracket 227.

Clamping screw 237 thus allows stylus 145' to be laterally adjustable in parallel with the Z-axis. These axial and lateral adjustments allow roller bearing tip 198 to be selectively positioned relative to the indexing slot 197, the tenon forming projection or profile 187, and the cutting tool 100.

A chip deflector, generally designated 238, may be mounted on tool carriage 89 by a dog leg rod 240 having one end secured within an aperture 241 in plate 90 by a clamping screw 243 threaded into an aperture 244 which intersects aperture 241. The body 245 of chip deflector 238 comprises a rectangular plate of transparent material, such as plexiglass, which is pivotally secured to the other end of dog leg rod 240 by a pair of brackets 247—247, which are attached to the mid portion of plate 245 by screws, studs or the like as shown in FIGS. 8 and 9.

While the best and other modes of the invention are shown in the accompanying drawings and have been described in detail in this specification, these modes represent only specific examples of the invention. Those skilled in the art will recognize that many changes, other than those described above, may be made in the construction and arrangement of components without departing from the scope of the invention as defined by the claims below.

What is claimed is:

1. A woodworking apparatus comprising:
   tool means for providing a rotating cutting tool;
   bed means for engaging an underlying support;
   a work carriage having a base mounted on said bed means for rectilinear sliding movement along a first axis in a first plane, and a work platform having a work surface for supporting and positioning a workpiece relative to said cutting tool, said platform being mounted on said base for rectilinear sliding movement along a second axis transverse to said first axis and in a second plane parallel to said first plane;
   first actuator means for causing movement of said base back and forth along said first axis;
   second actuator means for causing movement of said platform back and forth along said second axis;
   a tool carriage for carrying said tool means and positioning said cutting tool relative to said work surface, said tool carriage being mounted on said bed means for rectilinear sliding movement along a third axis transverse to said first and second axes;
   third actuator means including a lever mounted for pivotal movement and connecting means for causing movement of said tool carriage back and forth along said third axis in response to the pivotal movement of said lever so as to move said cutting tool toward and away from said work surface; and,
   biasing means providing a biasing force for urging said tool carriage away from said work surface to counterbalance the weight of said tool carriage, said tool means and said third actuator means.

2. The woodworking apparatus of claim 1 in which said biasing means includes means for providing a biasing force sufficient to cause said cutting tool to move away from said work surface when said third actuator means is not being actuated by an operator of said apparatus.

3. The woodworking apparatus of claim 2 in which said biasing force exceeds by about 2 to about 5 pounds a gravitational force which in the absence of said biasing force would cause said cutting tool to move toward said work surface when said third actuator means is not being actuated by an operator of said apparatus.

4. The woodworking apparatus of claim 1 in which said biasing means is a gas spring means comprising an apertured piston mounted for reciprocal movement within a pressure cylinder pressurized with a gas.

5. The woodworking apparatus of claim 4 in which said gas spring means further comprises valve means for adding a gas such as air to said cylinder and bleeding said gas from said cylinder so as to vary the gas pressure in said cylinder and thereby adjust the biasing force applied by said biasing means to said tool carriage.

6. The woodworking apparatus of claim 1 in which said biasing means is connected to said lever to bias said tool carriage away from said work surface.

7. The woodworking apparatus of claim 6 which further includes means for detachably connecting said biasing means to said lever at different distances along said lever from the fulcrum of its pivotal movement so as to change the magnitude of the biasing force provided for counterbalancing the weight of said tool carriage, said tool means and said third actuator means.

8. The woodworking apparatus of claim 1 in which said first actuator means comprises a first lever mounted for pivotal movement on a first fulcrum member, and a first connecting means for causing movement of said base back and forth along said first axis in response to pivotal movement of said first lever.

9. The woodworking apparatus of claim 8 in which said second actuator means comprises a second lever mounted for pivotal movement on a second fulcrum member, and connecting means for causing movement of said platform back and forth along said second axis in response to pivotal movement of said second lever.

10. The woodworking apparatus of claim 9 in which each of said fulcrum members is carried on a corresponding track supported on said bed means and is adjustable along said track so as to change the operative position of a distal end of the lever.

11. The woodworking apparatus of claim 10 in which the track of the fulcrum member for said first lever is mounted on said bed means, and the track of the fulcrum member for said second lever is mounted on the base of said work carriage.

12. The woodworking apparatus of claim 10 in which the lever of said third actuator means is pivotally mounted on a third fulcrum member carried by a corresponding track supported on said bed means, said third fulcrum member being adjustable along said track so as to change the operative position of a distal end of said third lever.

13. The woodworking apparatus of claim 1 in which said platform carries a plate for providing said work surface and a clamping means for clamping the workpiece in a predetermined position on said work surface, said plate being pivotally mounted on said work platform so as to tilt the workpiece relative to the rotational axis of said cutting tool.

14. The woodworking apparatus of claim 1 which further includes a pattern means for guiding relative motion between said work carriage and said tool carriage during cutting of the workpiece by said cutting tool.

15. The woodworking apparatus of claim 14 in which said pattern means comprises a template means mounted on an inner portion of said work carriage and a follower means mounted on an opposing portion of said tool carriage.

16. The woodworking apparatus of claim 15 in which said follower means comprises an elongated stylus projecting outward from said tool carriage toward said work carriage, and in which said template means comprises a template member having a profiled surface positioned to be engaged by a projecting portion of said stylus, said profiled surface being arranged in a pattern to be cut in the workpiece by said cutting tool.

17. The woodworking apparatus of claim 16 in which said template means further comprises means for detachably securing to said tool carriage alternative template members each with a different pattern of profiled surface.

18. The woodworking apparatus of claim 1 in which the sliding movement of said base is provided by a pair of parallel tracks mounted on said bed means and engaged by a corresponding one of a pair of bearing means each connected to said base, and in which the sliding movement of said platform is provided by a pair of parallel tracks mounted on said base and engaged by a corresponding one of a pair of bearing means each connected to said platform.

19. The woodworking apparatus of claim 18 in which each of the bearing means connected to said base comprise a pedestal depending from said base and having linear bearing therein for engaging the corresponding one of said bed tracks, and each of the bearing means connected to said platform comprise a pedestal depending from said platform and having therein linear bearings therein for engaging the corresponding one of said base tracks.

20. The woodworking apparatus of claim 19 in which at least one of said base pedestals and at least one of said platform pedestals include means for locking said base and said platform, respectively, in a fixed position relative to the corresponding pair of tracks.

21. The woodworking apparatus of claim 1 which further includes means for securing said bed means to an underlying support, and in which said woodworking apparatus is of a portable size and weight.

22. The woodworking apparatus of claim 1 in which said first axis is tilted relative to the horizontal, and said apparatus further includes a second biasing means providing a biasing force urging said work carriage away from said tool carriage to counterbalance the weight of said work carriage, said workpiece and said first actuator means, in which said first actuator means includes a first lever mounted for pivotal movement and first connecting means for causing movement of said work carriage back and forth along said first axis in response to the pivotal movement of said first lever, and in which said second biasing means is connected to said first lever to bias said work carriage away from said tool carriage.

23. The woodworking apparatus of claim 16 in which said follower means further comprises roller bearing means mounted at the outer end of said projecting portion of said stylus so as to rotatably engage the profiled surface of said template means.

24. The woodworking apparatus of claim 17 in which said detachable securing means comprises at least one keyhole slot passing through said template member and having a hole portion and a slot portion, and at least one elongated fastener member mounted on said work carriage and having a shaft portion receivable in both said hole portion and said slot portion of said keyhole slot and a clamping head receivable only in said hole portion of said keyhole slot, said fastener member having a clamping position in which said clamping head securely engages at least a portion of the perimeter of said slot to prevent axial movement of said template member relative to said work carriage and a release position permitting axial movement of said template member relative to said work carriage.

25. The woodworking apparatus of claim 24 in which said detachable means further includes a second one of said keyhole slots and a corresponding second one of said fastener members receivable in said second keyhole slot.

26. The woodworking apparatus of claim 4 in which said apertured piston carries a piston rod having a threaded distal end which extends from one end of said cylinder and is received in a threaded recess in said bed means; and in which said gas spring means further comprises joint means at an end of said cylinder opposite to said one end for rotatably connecting said cylinder to said tool carriage.

27. The woodworking apparatus of claim 26 in which said cylinder is positioned opposite to a side edge of said tool carriage.

* * * * *